United States Patent [19]

Negishi et al.

[11] Patent Number: 5,726,689
[45] Date of Patent: Mar. 10, 1998

[54] MAPPING APPARATUS AND METHOD

[75] Inventors: Hiroyasu Negishi; Masatoshi Kameyama, both of Kanagawa, Japan

[73] Assignee: Mitsubishi Denki Kabushiki Kaisha, Tokyo, Japan

[21] Appl. No.: 500,167

[22] Filed: Jul. 11, 1995

[30] Foreign Application Priority Data

Oct. 28, 1994 [JP] Japan .................. 6-265276

[51] Int. Cl.⁶ .................................................. G06F 17/00
[52] U.S. Cl. .................................. 345/430; 345/441
[58] Field of Search .......................... 395/800, 141, 395/143, 130, 131, 125; 345/430, 441

[56] References Cited

U.S. PATENT DOCUMENTS 5,386,509  1/1995  Suzuki ............................ 395/162
5,528,737  6/1996  Sfarti ............................. 395/141
5,586,234  12/1996 Sakuraba ........................ 395/130

FOREIGN PATENT DOCUMENTS 6-266852  9/1994  Japan .

*Primary Examiner*—Eric Coleman
*Attorney, Agent, or Firm*—Wolf, Greenfield & Sacks, P.C.

[57] ABSTRACT

This invention provides a circuit, which performs a high quality mapping operation by giving a perspective transformation effect to a mapping data of a rendering polygon. The circuit has a mechanism to divide edges and mapping data of a figure in a display and calculate a virtual mapping address, a pixel generator to generate a pixel data for pixels inside of the displayed figure and a virtual mapping address of the pixel data, a virtual address converter to convert the virtual mapping address to a mapping address, and a mapping memory to store the mapping data.

30 Claims, 11 Drawing Sheets

A CONFIGURATION CHART OF A MAPPING APPARATUS

A CONFIGURATION CHART OF A MAPPING APPARATUS

A CONFIGURATION CHART OF A PIXEL DATA GENERATOR

EDGE INTERPOLATION CIRCUITS & PIXEL
INTERPOLATION CIRCUIT

A CONFIGURATION OF AN INTERPOLATION CIRCUIT

A CONFIGURATION A VIRTUAL ADDRESS CONVERTER

A VIRTUAL ADDRESS CONVERTOR FOR
THREE-DIMENSIONAL MAPPING MEMORY

A CONFIGURATION CHART OF
A SHADING MAPPING APPARATUS

RESOLUTION OF PERSPECTIVE TRANSFORMATION

A TEXTURE MAPPING APPARATUS ACCORDING
TO THE RELATED ART

A CONFIGURATION OF EDGE INTERPOLATION
CIRCUITS & A PIXEL INTERPOLATION CIRCUIT
ACCORDING TO THE RELATED ART

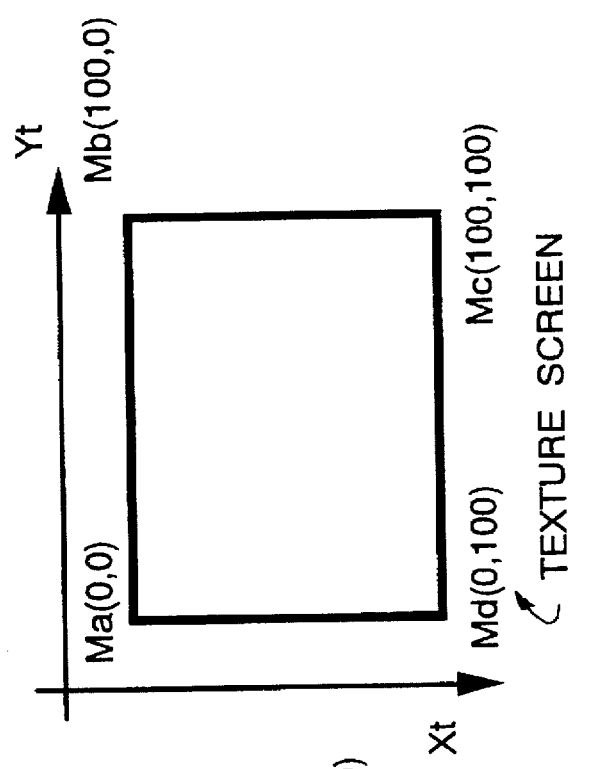
FIG. 13 (b) RELATED ART
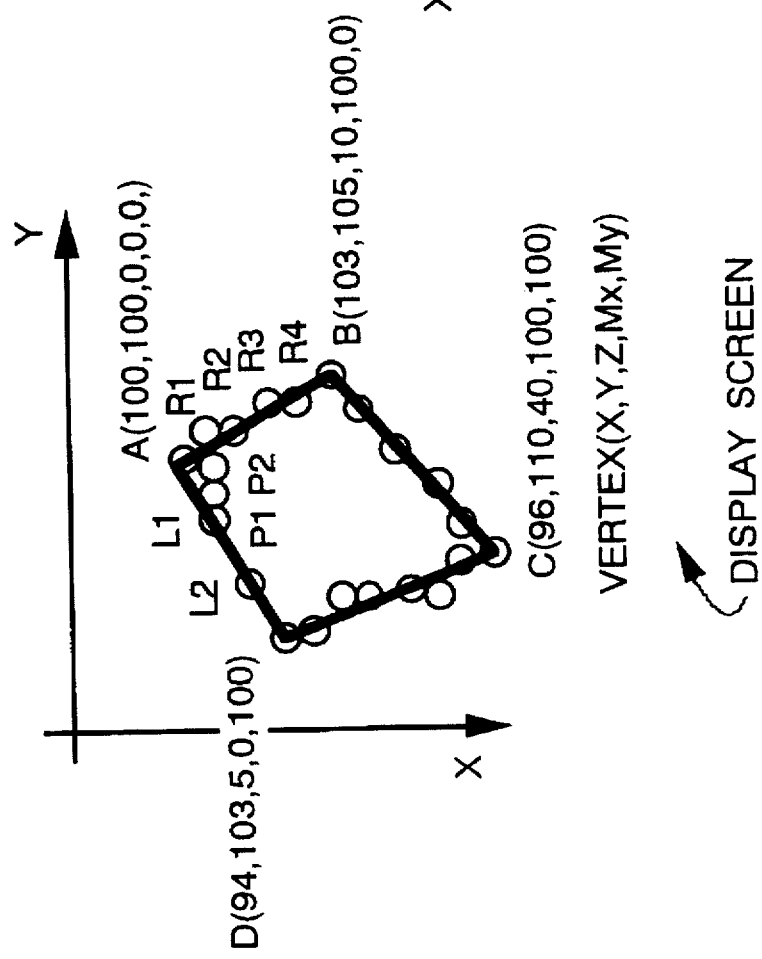
FIG. 13 (a) RELATED ART

A CONFIGURATION CHART OF A DISPLAY APPARATUS WITH A PERSPECTIVE EFFECT ACCORDING TO THE RELATED ART

FIGURE OF IMAGE RENDERING IN A DISPLAY APPARATUS WITH A PERSPECTIVE EFFECT ACCORDING TO THE RELATED ART

MAPPING APPARATUS AND METHOD

BACKGROUND OF THE INVENTION

1. Field of the Invention

This invention relates to a mapping apparatus which maps of various data such as textures and colors, etc. in a displayed figure on a screen.

2. Description of the Related Art

A texture mapping apparatus according to a related art is explained in reference with FIGS. 11–15.

In FIG. 11, a micro processor 141 comprises a mechanism to divide edges of a polygon to left edges and right edges. A left edge interpolation circuit 142 interpolates the left edges which are divided by the micro processor 141, and a right edge interpolation circuit 143 interpolates the right edges which are divided by the micro processor 141. A pixel interpolation circuit 144 uses two point data which are outputted from the left edge interpolation circuit 142 and the right edge interpolation circuit 143, and interpolates a straight line which is parallel with a scan line defined by the two points. A texture memory 145 stores a texture data (also called as a mapping data, hereinafter) at a texture address (also called as a mapping address, hereinafter). The texture address is outputted from the pixel interpolation circuit 144 to the texture memory. The texture memory 145 outputs a texture data which is indicated by the texture address. A scan transformer 146 includes the left edge interpolation circuit 142 and the right edge interpolation circuit 143, and performs a transformation from edges to scan lines. As shown in FIG. 13(a), a polygon ABCD is divided into a plurality of segments L1R1, L2R2, etc. which are on scan lines.

FIG. 12 illustrates a sample of the left edge interpolation circuit 142, the right edge interpolation circuit 143 and the pixel interpolation circuit 144.

In FIG. 12, an interpolation circuit 151 generates X coordinate values by interpolation with respect to a display screen, an interpolation circuit 152 generates Y coordinate values by interpolation with respect to the display screen, an interpolation circuit 153 generates Z coordinate values in interpolation on the display screen, an interpolation circuit 154 generates X coordinate values Xt in interpolation on a texture plane, and an interpolation circuit 155 generates Y coordinate values Yt in interpolation on the texture plane.

An operation of a texture mapping apparatus according to the related art is explained in reference with FIGS. 11, 12, 13(a) and 13(b).

For the micro processor 141, X, Y and Z coordinate values of vertex data A, B, C and D of a polygon, which is displayed on a screen, and texture address Mx, My of vertices Ma, Mb, Mc and Md on a texture plane, as shown in FIG. 13(b), which correspond to each of the vertices A, B, C and D are provided. The micro processor 141 divides edges of the polygon, which is displayed on the screen, to left edges A-D-C and right edges A-B-C. The micro processor 141 also divides edges on the texture plane, which correspond to each of the vertices of the polygon, to edges Ma-Mb-Mc and edges Ma-Md-Mc. This division of the polygon is performed so that a vertex with the maximum Y coordinate value and a vertex with the minimum Y coordinate value become endpoints of the edges.

Then, the X, Y and Z coordinate values of the vertex A, which is a start point for each of the left edges A-D-C and the right edges A-B-C, and the X coordinate value Mx and the Y coordinate value My of the vertex Ma, which corresponds to the vertex A on the texture plane, are set in each of the interpolation circuits 151, 152, 153, 154 and 155 for each of X, Y, Z, Mx and My in each of the left edge interpolation circuit 142 and the right edge interpolation circuit 143.

The micro processor 141 computes each of interpolation values for X, Y, Z, Mx and My at a start point A of each of the interpolation circuits. The interpolation value is a fraction of a difference of each of coordinate values of the vertices with a difference of Y coordinate values. The interpolation value of Y is fixed at 1.

In each of the interpolation circuits, an interpolation value is added to each of the values at the start point sequentially. Interpolation is performed from a point with the minimum Y coordinate value positively along a Y-axis. As a result, the left edge interpolation circuit 142 creates points L1, L2 and D, and the right edge interpolation circuit 143 creates points R1, R2, R3, R4 and B.

In this edge interpolation, for the direction of the Y-axis, a same interpolation value (=1) is added in both the left edge interpolation circuit 142 and the right edge interpolation circuit 143. Therefore, a point on the left edge and a point on the right edge which are outputted from each of the edge interpolation circuits are on a same scan line.

For example, in FIG. 13(a), starting from point A, point L1 is created from the left edge interpolation circuit 142 and point R1 is created from the right edge interpolation circuit 143 in a first interpolation. The point L1 and the point R1 are on a same scan line.

The pixel interpolation circuit 144 creates points which connect points, which are outputted from the left edge interpolation circuit and the right edge interpolation circuit. For example, to connect point L1 and point R1, points P1 and P2 are created. Data of coordinate values X, Y, Z, Mx and My of point L1, which are outputted from the left edge interpolation circuit 142, are inputted to each of the interpolation circuits 151, 152, 153, 154 and 155, which comprise the pixel interpolation circuit, as start point data of the pixel interpolation circuit 144.

The micro processor 141 reads data of points L1 and R1 which are outputted from the left edge interpolation circuit 142 and the right interpolation circuit 143, and computes interpolation values to create points between points L1 and R1 on a scan line. The interpolation value is a fraction of each of the differences of coordinate values Z, Mx and My between the two points with a difference of X coordinate values between the two points. The computed interpolation values are set in each of the interpolation circuits 151, 152, 153 154 and 155 in the pixel interpolation circuit 144.

In this process, interpolation is performed in a unit of a pixel. Therefore, an interpolation value for a direction of the X-axis is determined as 1, and an interpolation value for a direction of the Y-axis is determined as 0. The pixel interpolation circuit 144 operates similarly with the left edge interpolation circuit and the right edge interpolation circuit, and creates the points P1 and P2 on a scan line.

X, Y and Z coordinate values of points are outputted from the pixel interpolation circuit 144 and inputted to a frame memory, and Mx and My coordinate values are inputted to the texture memory 145 as the texture addresses.

The texture memory outputs color data R, G and B of texture addresses, which are indicated by Mx and My coordinate values, to the frame memory. Then, an image is rendered on a screen in accordance with the X, Y and Z coordinate values and color data R, G and B, which are outputted to the frame memory 140.

FIG. 14 illustrates a display apparatus with a perspective transformation effect according to the related art, which is described in Unexamined Published Japanese Patent application 4-220783. In FIG. 14, a graphics processor 170 controls data of a polygon. An edge stepper 172 performs step processing along an edge, and an X stepper 174 performs step processing in a direction of the X-axis. An address stack 176 stores X coordinate values and Y coordinate values of pixels. A parameter stack 178 stores parameters of pixels (color data R, G, B, etc.). A perspective interpolator 1710 gives an effect of a perspective transformation to the parameters of the pixels. An output formatter 1712 sends data in the address stack 176 and data in the perspective interpolator 1710 to a down-stream hardware.

FIG. 15 illustrates a method of image rendering in the display apparatus according to the related art.

The display apparatus with a perspective transformation effect according to the related art is explained in reference with FIGS. 14 and 15.

The graphics processor 170 inputs vertex data to the edge stepper 172 and the X stepper 174 to create pixels in an inside of a polygon.

Assuming that the polygon is configured with vertices A, B, C and D, which are defined with X coordinate values, Y coordinate values, W perspective values of the vertices (1/Z) and parameters (color data, etc.), the edge stepper 172 steps on a segment AB from the vertex A, which is a first vertex, along a Y-axis one by one scan line. At each of points on the segment AB, the X stepper 174 creates points on the scan line by stepping to a direction of the X-axis until another edge is reached. For example, when the edge stepper 172 generates coordinate values X and Y and a perspective parameter W of a point on the segment AB, the X stepper 174 steps from the point until an edge A-C is reached. The edge stepper 172 and the X stepper 174 step repeatedly, and pixels are created in the inside of the polygon.

X coordinate values and Y coordinate values of the created pixels are stored in the address stack 176. Parameter values (R, G, B, etc.) which correspond to each of the pixels are stored in the parameter stack 178. The X coordinate values, Y coordinate values, Z coordinate values and values of R, G and B are inputted to the perspective interpolator 1710 for perspective interpolation. Parameter values after perspective interpolation, the X coordinate values and the Y coordinate values are sent from an output formatter 1712 to a down-stream hardware.

An operation of the perspective interpolator 1710, which performs a perspective interpolation, is explained referring to FIG. 15. According to this perspective transformation method, a fraction F of a total distance in perspective space is used. The fraction F is multiplied with a parameter, and a perspective effect is realized. The fraction F is calculated with a following equation:

[Number 1]

$$F = W1(C-C1)/\{W1(C-C1)+W2(C2-C)\} \quad (1)$$

In this equation, W1 and W2 are perspective values of first and second endpoints A B, of an edge A-B, and C is X or Y coordinate value of a focusing pixel on the edge A-B. C1 is X or Y coordinate value of the first endpoint A of the edge A-B, and C2 is X or Y coordinate value of the second endpoint B of the edge A-B, which differs from the first endpoint A of the edge A-B. The fraction F is calculated for each of points which are created by the edge stepper 172. The calculation is also made for a point on a corresponding edge A-C on a same scan line.

Then, a parameter value (R, G, B, etc.) for the point on the edge A-B is calculated with a following equation:

$$P = P1 - F(P1-P2) \quad (2)$$

In this equation, P is a parameter value of the focusing pixel. P1 is a parameter of a pixel at the first endpoint A of an edge A-B, and P2 is a parameter of a pixel at the second endpoint B, which differs from the first endpoint A. The calculation of the parameter value is also made for a point on a corresponding edge A-C on a same scan line.

For example, in FIG. 15, each of total distance fractions Fa and Fe at focusing points Xs and Xe on edges A-B and A-C in perspective space are calculated with the equation (1). Then, parameter values at points Xs and Xe are calculated with the equation (2).

Then, for each of points on a scan line, Xs and Xe are taken as endpoints of an edge Xs-Xe, and Fp is calculated with the equation (1). Then, parameter values at points on the scan line are calculated with the equation (2) in a same way for points on the edge Xs-Xe.

Calculations with equations (1) and (2) are made in each of points on an edge and in each of points on a scan line. In this way, a perspective processing is performed for parameters of pixels within a polygon.

A texture mapping apparatus according to the related art is configured as above-stated. Therefore, perspective transformations are performed for vertices of and points inside of a polygon, which is to be mapped.

However, perspective transformations of vertices of a texture data and points of a texture data, which is pasted to the points of the polygon, are not performed. Therefore, for displaying the texture, perspective effect is not realized. Without the perspective effect, a mapping image lacks in three-dimensional reality.

Furthermore, since the texture data is defined with a two-dimensional parameter Mx, My, there is a limitation in application of the texture data as mapping data.

SUMMARY OF THE INVENTION

This invention has been designed to solve the above-stated problems in the related art.

It is an object of this invention to provide a mapping apparatus which realizes a perspective transformation effect also for a texture data or a mapping data. In one embodiment, a mapping data address is transformed to a virtual mapping address once, interpolated, and transformed again to a mapping address.

It is also an object of this invention to provide a mapping apparatus which is able to process mapping data for a three-dimensional data in addition to a two-dimensional data.

It is further an object of this invention to provide a mapping apparatus which is able to reflect the perspective effect in coloring of a whole polygon, which a mapping data is pasted to, for a shading. According to the related technic, perspective transformation is performed only for vertices and points of the polygon.

According to one aspect of this invention, a mapping apparatus includes a processor that is programmed to divide edges of a rendering polygon having edges and pixels into left edges and right edges, correspond the left edges and the right edges to edges of a two-dimensional mapping data, divide the edges of the two-dimensional mapping data to mapping data left edges and mapping data right edges, each of the mapping data left edges and mapping data right edges having endpoints, and calculate a virtual mapping address and a virtual mapping coefficient at each endpoint of the mapping data left edges and the mapping data right edges, a pixel data generator, coupled to the processor and having an output that provides coordinate data, virtual mapping address and virtual mapping coefficient of each pixel of the rendering polygon, a virtual address converter having an input that receives mapping data including the virtual mapping address and the virtual mapping coefficient from the pixel data generator, and an output that provides a mapping address, and a mapping memory that stores the mapping data, the mapping memory having an input that receives the mapping address from the output of the virtual address converter, and an output that provides the mapping data that corresponds to the mapping address.

According to another aspect of this invention, a mapping method for mapping the mapping data stored in a mapping memory in a rendering figure having vertices includes the steps of calculating a virtual mapping address by dividing a mapping address corresponding to each of the vertices of the rendering figure with a Z coordinate value of each of the vertices, generating a virtual mapping coefficient from the mapping address corresponding to each of the vertices, wherein the virtual mapping coefficient is defined as an inverse number of the Z coordinate value (1/Z), interpolating along edges by interpolating the virtual mapping address and the virtual mapping coefficient linearly along edges of the rendering figure, the edges being between the vertices, interpolating along a scan line by interpolating the virtual mapping address and the virtual mapping coefficient linearly along a scan line located between the edges, dividing the virtual mapping address of a pixel by the virtual mapping coefficient to determine a mapping address, reading rendering data by providing the mapping address to a mapping memory, and displaying the rendering data.

According to another aspect of this invention, a mapping method includes dividing edges of a rendering polygon into left edges having endpoints and right edges having endpoints, calculating a virtual color value and a virtual color coefficient at each of endpoints of the left edges and the right edges, generating coordinate data, virtual color value and virtual color coefficient for pixels that are inside and for pixels that are on the edges of the rendering polygon, and converting to a color value from the virtual color value and the virtual color coefficient.

According to another aspect of this invention, a method for generating texture mapped data for pixels of a figure to be rendered on a display includes the steps of receiving a display screen that describes the pixels, receiving a texture map that describes texture mapping data for the figure, creating a virtual mapping space from the texture screen and the display screen, the virtual mapping space including texture mapped data for each pixel of the figure, and generating texture mapped data for the pixels from the virtual mapping space.

According to another aspect of this invention, an apparatus for generating texture mapped data for pixels of a figure to be rendered on a display includes mechanism for receiving a display screen that describes the pixels, mechanism for receiving a texture map that describes texture mapping data for the figure, mechanism, coupled to the mechanism for receiving a display screen and the mechanism for receiving a texture map, for creating a virtual mapping space from the texture screen and the display screen, the virtual mapping space including texture mapped data for each pixel of the figure, and mechanism for generating texture mapped data for the pixels from the virtual mapping space.

Other objects features, and advantages of the invention will be apparent from the follow description when taken in conjunction with the accompanying drawings.

BRIEF EXPLANATION OF THE DRAWINGS

In the drawings.

FIG. 13(a) illustrates a division of the edges in the mapping apparatus according to the related art;

FIG. 13(b) shows a texture plane according to the related art;

DESCRIPTION OF THE PREFERRED EMBODIMENTS

Embodiment 1

Figure 1:
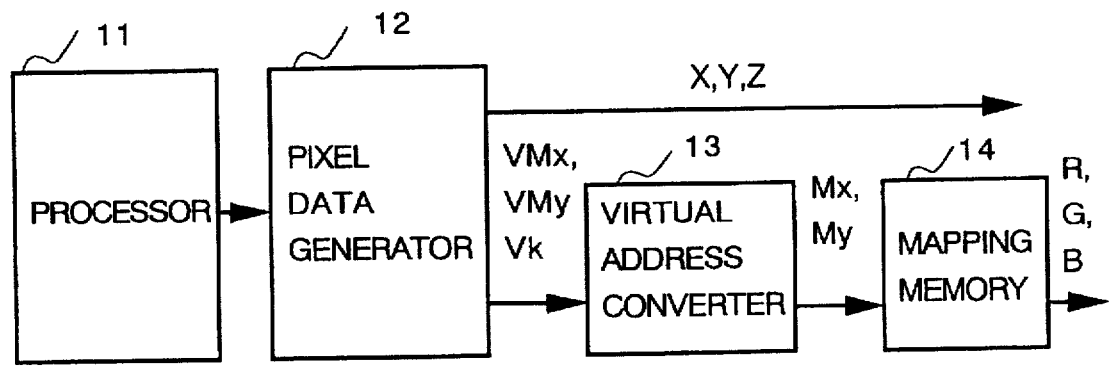
FIG. 1 is a configuration chart of the mapping apparatus in an embodiment of this invention.

FIGS. 1–6 show embodiment 1 of this invention. FIG. 1 is a configuration chart of a mapping apparatus according to this invention.

In FIG. 1, a micro processor 11 divides edges of a polygon, which is a drawn figure, to left edges and right edges, corresponds the edges to edges of mapping data on a texture plane, divides the edges of the mapping data to mapping data left edges and mapping data right edges. Micro processor 11 also calculates virtual mapping address and virtual mapping coefficients in each of endpoints on the mapping data left edges and mapping data right edges. A pixel data generator 12 generates a pixel data within the drawn figure and virtual mapping addresses and virtual mapping coefficients which correspond to pixels of the pixel data in virtual mapping space in accordance with the information of the edges which are divided by the micro processor 11. A virtual address converter 13 converts the virtual mapping addresses and virtual mapping coefficients, which are generated by the pixel data generator 12, to actual mapping addresses. A mapping memory 14 stores the mapping data, and outputs the mapping data, which are indicated by the actual mapping data addresses which are outputted from the virtual address converter 13.

Figure 2:
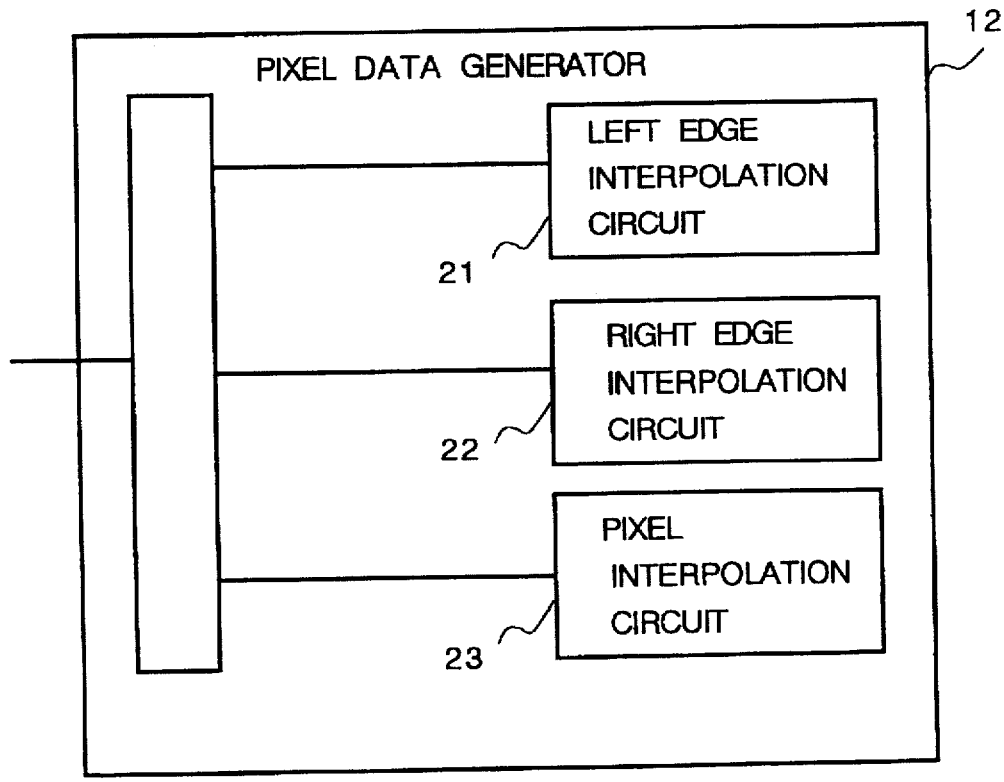
FIG. 2 is a configuration chart of the pixel data generator in the mapping apparatus in an embodiment of this invention.

FIG. 2 illustrates a sample of the pixel data generator 12 of FIG. 1.

In FIG. 2, a left edge interpolation circuit 21 interpolates the left edges and the mapping data left edges, which are divided by the micro processor 11. A right edge interpolation circuit 22 interpolates the right edges and the mapping data right edges, which are divided by the micro processor 11. A pixel interpolation circuit 23 uses point data on edges and point data on edges of the mapping data, which are outputted from each of the left edge interpolation circuit 21 and the right edge interpolation circuit 22, and interpolates a straight line which is parallel with a scan line defined with two points of the point data.

Figure 3:
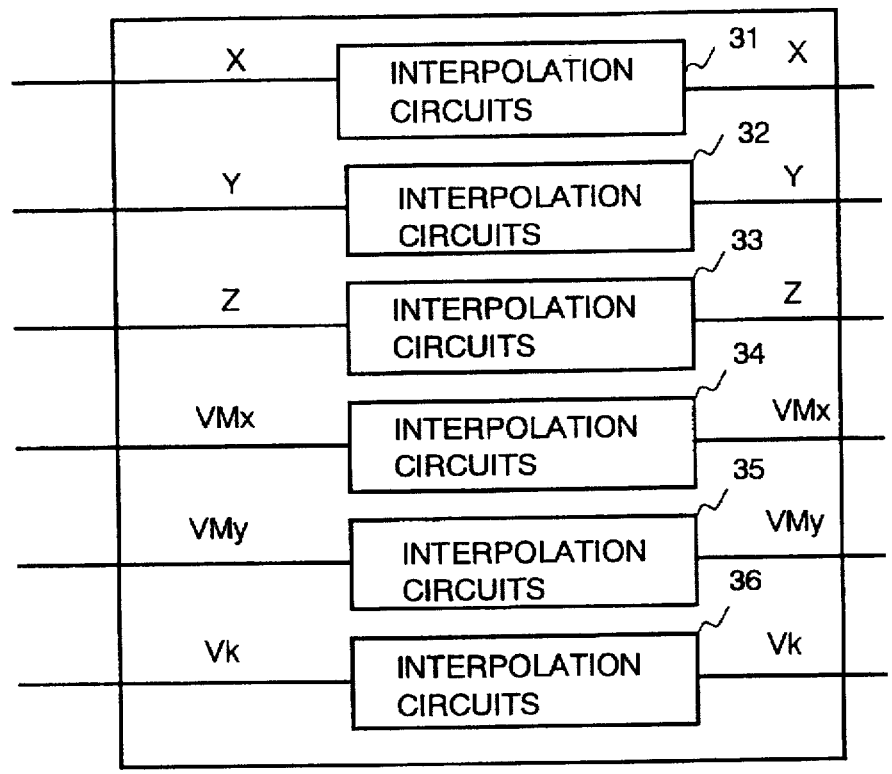
FIG. 3 is a configuration chart of the left and right edge interpolation circuits and the pixel interpolation circuit in the mapping apparatus in an embodiment of this invention.

FIG. 3 illustrates a sample of the left edge interpolation circuit 21, the right edge interpolation circuit 22 and the pixel interpolation circuit 23. In FIG. 3, an interpolation circuit 31 generates X coordinate values on a display screen in interpolation. An interpolation circuit 32 generates Y coordinate values on the display screen in interpolation. An interpolation circuit 33 generates Z coordinate values on the display screen in interpolation. An interpolation circuit 34 generates X coordinate values on a virtual mapping plane by interpolation. An interpolation circuit 35 generates Y coordinate values on a virtual mapping plane in interpolation. An interpolation circuit 36 interpolates virtual mapping coefficients.

Figure 4:
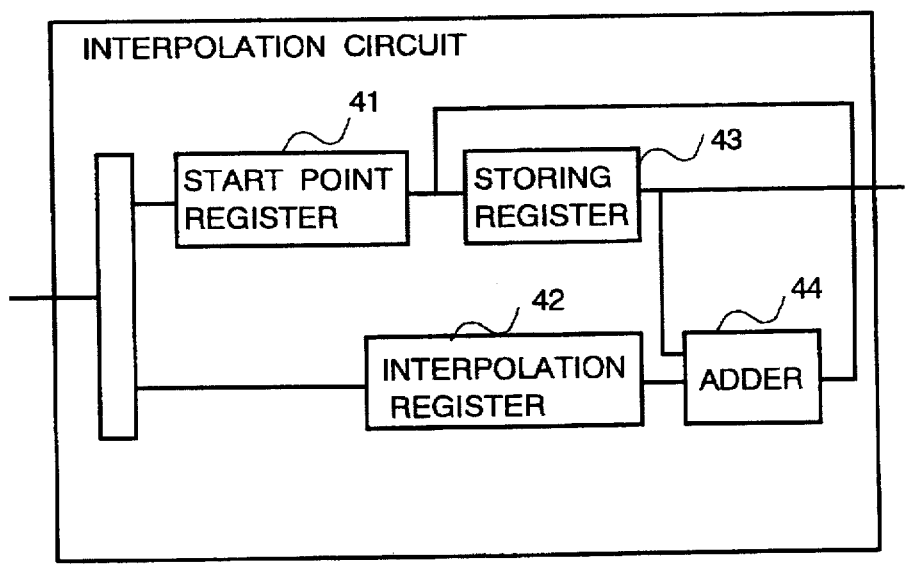
FIG. 4 is a configuration chart of the interpolation circuit in the mapping apparatus in an embodiment of this invention.

FIG. 4 illustrates a sample of the interpolation circuits 31, 32, 33, 34, 35 and 36 of FIG. 3. In FIG. 4, a start point register 41 stores a start point of a interpolating straight line, an interpolation register 42 stores interpolation data and a storing register 43 stores interpolated data or data in the start point register 41. An adder 44 interpolates by accumulating the data in the storing register 43 and the data in the interpolation register 42.

Figure 5:
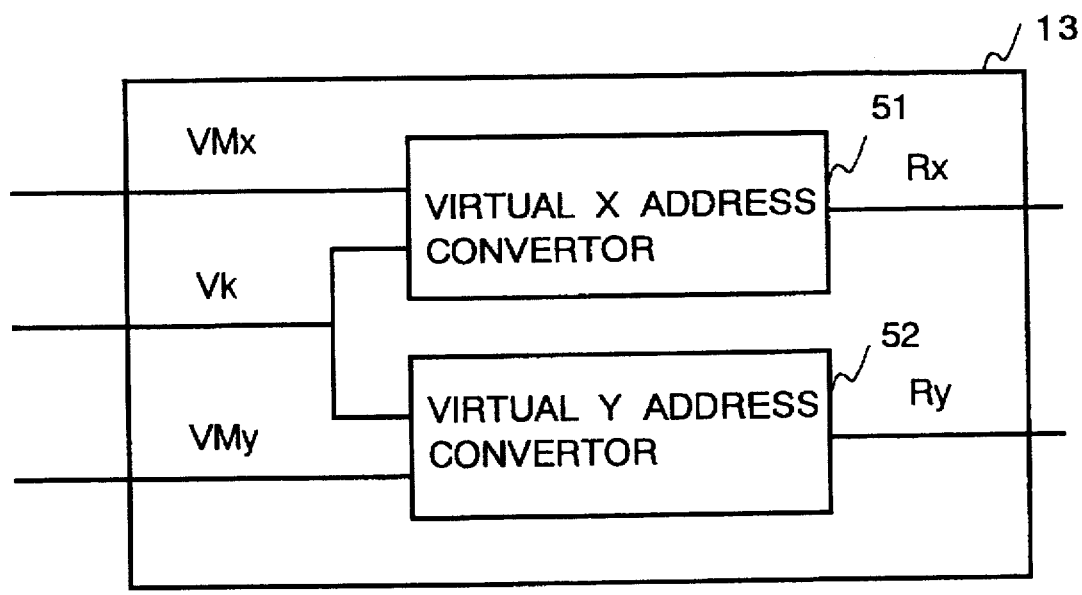
FIG. 5 is a configuration chart of the virtual address converter in the mapping apparatus in an embodiment of this invention.

FIG. 5 illustrates an embodiment of the virtual address converter 13 of FIG. 1. In FIG. 5, a virtual X address converter 51 uses an X coordinate value of a virtual mapping address and a virtual mapping coefficient, which are inputted to the virtual X address converter 51, and divides the X coordinate value of the virtual mapping address with the virtual mapping coefficient. A virtual Y address converter 52 uses a Y coordinate value of the virtual mapping address, which are inputted to the virtual Y address converter 52, and divides the Y coordinate value of the virtual mapping address with the virtual mapping coefficient.

Figure 16:
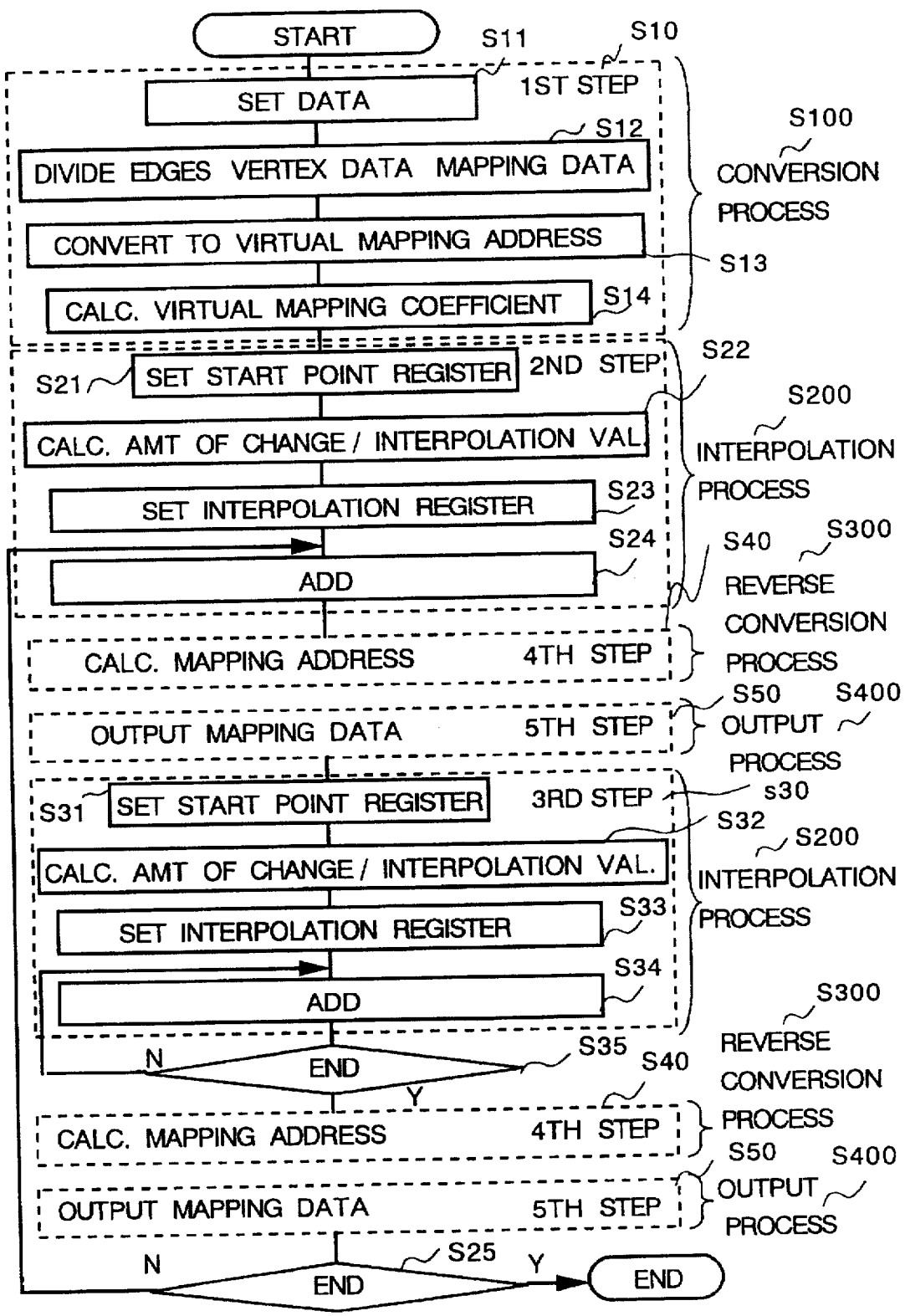
FIG. 16 is a flow chart in an embodiment of this invention.

In reference with a sample illustrated in FIG. 6 and a flow chart of FIG. 16, operation is explained in the following.

According to a method of the related art, in order to obtain mapping addresses corresponding to all pixels in a drawn polygon, mapping addresses corresponding to vertices are obtained in direct interpolation. However, according to a method in an embodiment of this invention, the mapping addresses corresponding to the vertices are converted to virtual mapping addresses once (step S100), the virtual mapping addresses are interpolated to get virtual mapping addresses of rendering pixels (step S200), and the virtual mapping addresses of the rendering pixels are converted back to mapping addresses (step S300). Then, the mapping addresses are outputted to the mapping memory (step S400). In this method, mapping with a perspective effect is realized.

For illustrative purposes, it is assumed that mapping data to be mapped in a polygon on a display screen are stored in the mapping memory 14. Each of X, Y and Z coordinate values of vertex data (vertices A, B, C and D) of a displaying polygon and data of vertices Ma, Mb, Mc and Md in mapping data which correspond to the vertices A, B, C and D are set to micro processor 11 (step S11). Edges of the displaying polygon are divided to left edges and right edges by the micro processor 11 (step S12). The edges are divided so that a vertex with the maximum Y coordinate value and a vertex with the minimum Y coordinate value among the vertices of the polygon become endpoints of the edges. In this example, edges are divided to right edges A-B-C and left edges A-D-C so that vertex A with the minimum Y coordinate value and vertex C with the maximum Y coordinate value become the endpoints of the edges.

At the same time, edges of mapping data corresponding to the edges of the displayed polygon are also divided to left edges and right edges (step S12). The edges of the mapping data are divided to the right edges Ma-Mb-Mc and the left edges Ma-Md-Mc.

Then, mapping addresses, which indicate the vertices of the mapping data which correspond to the coordinate values of the vertices of the polygon, are converted to virtual mapping addresses (step S13), and a virtual mapping coefficient in order to convert the virtual mapping addresses to original mapping addresses is obtained (step S14).

When the mapping address is (Mx, My), the virtual mapping address (VMx, VMy) is defined with VMx=Mx/Z and VMy=My/Z, and a virtual mapping coefficient Vk is defined with Vk=1/Z.

Figure 6:
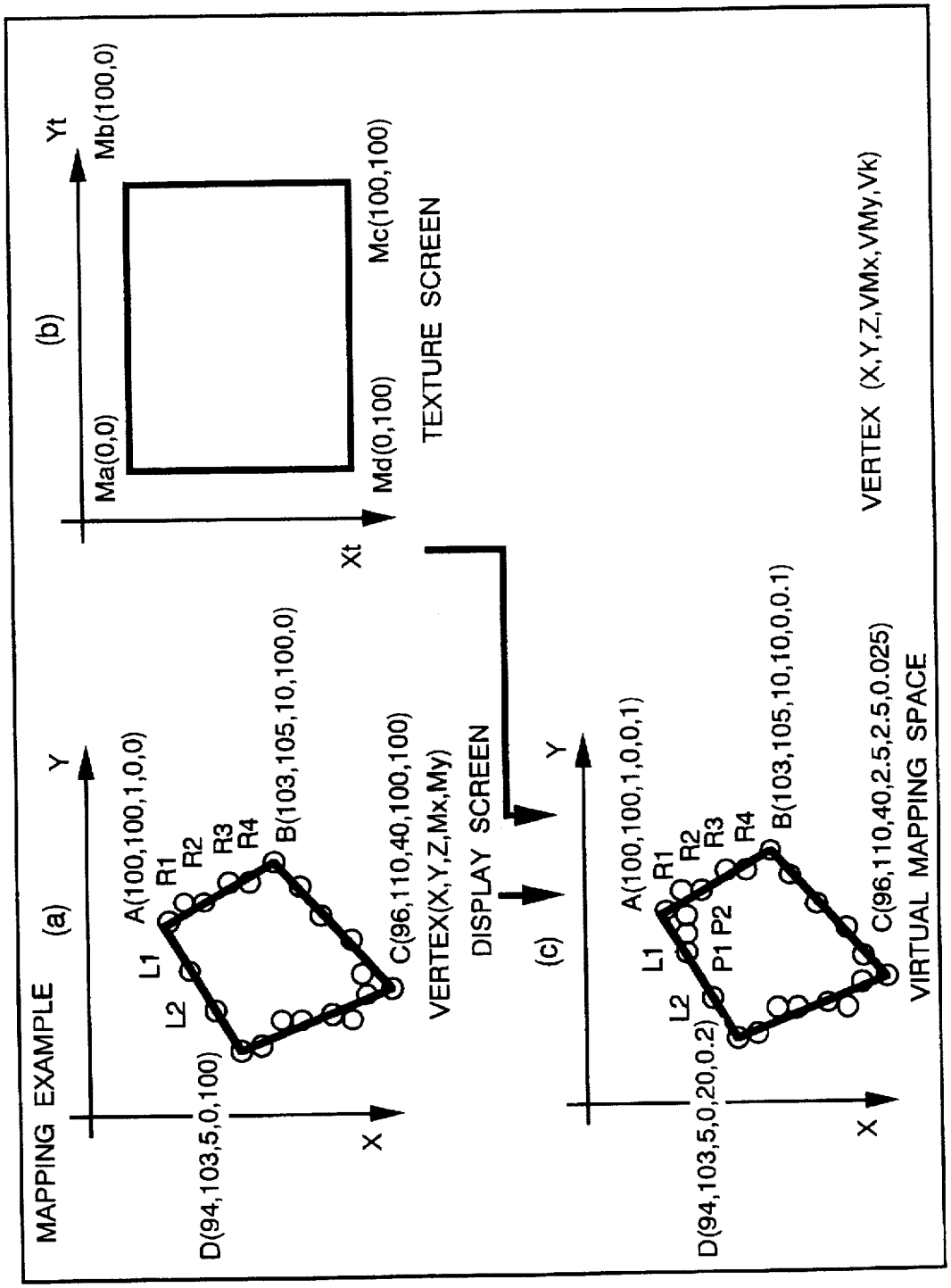
FIG. 6 illustrates mapping operation.

For example, in (c) of FIG. 6, since the mapping addresses are Z=40, Mx=100 and My=100, the virtual mapping addresses of the vertex C are VMx=2.5, VMy=2.5 and the virtual mapping coefficient Vk=0.025.

Then, the X, Y and Z coordinate values of the vertex A, which is a start point of each of the left edges and the right edges, the virtual mapping address VMx, VMy of the vertex Ma corresponding to the vertex A in the mapping data, and the virtual mapping coefficient Vk are inputted to each of the start point registers 41 of the interpolation circuits 31, 32, 33, 34, 35 and 36, which constitute each of the left edge interpolation circuit 21 and the right edge interpolation circuit 22 (step S21).

For example, when amounts of changes of each of X, Y, Z, VMx, VMy and Vk between two endpoints on each of the edges are ΔX, ΔY, ΔZ, ΔVMx, ΔVMy and ΔVk, and the interpolation values are dX, dY, dZ, dVMx, dVMy and dVk, the micro processor 11 calculates interpolation values as follows (step S22): dX=ΔX/ΔY, dY=1, dZ=ΔZ/ΔY, dVMx =ΔVMx/ΔY, dVMy=ΔVMy/ΔY, dVk=ΔVk/ΔY.

For example, for the right edges of FIG. 6, the amounts of changes are calculated as follows: ΔX=103−100 =3, ΔY=105−100=5, ΔZ=10−1=9, ΔVMx=10−0 =10, ΔVMy= 0−0=0, ΔVk=0.1−1=−0.9. The interpolation values are dX=3/5=0.6, dY=1, dZ=9/5 =1.8, dVMx=10/5=2.0, dVMy= 0/5=0, dVk=−0.9/5=−0.18.

Then, the interpolation values are inputted to each of the interpolation registers 42 in each of the edge interpolation circuits 31, 32, 33, 34, 35 and 36 (step S23). When necessary data for interpolation are provided for each of the registers, data in each of the start point registers 41 in each of the interpolation circuits are inputted to the storing register 43. The data in the storing register 43 and the data in the interpolation register 42 are added by the adder 44. The added data are stored in the storing register (step S24). The data in the storing register 43 and the data in the interpolation register 42 are repeatedly added (step S25), and R1, R2, R3, R4 and B for the right edges and L1, L2 and D for the left edges are created.

For this edge interpolation, the Y coordinate value of the start point of the left edges and the Y coordinate value of the start point of the right edges are the same, and dY=1. Therefore, when the left edge interpolation circuit 21 and the right edge interpolation circuit 22 operate synchronously, points on each of the left edges and the right edges, which are outputted from each of the left edge interpolation circuit 21 and the right edge interpolation circuit 22, are on a same scan line.

Referring to FIG. 6 for illustrative purposes, the left edge interpolation 21 and the right edge interpolation circuit 22 create points L1 and R1, which are on a same scan line, synchronously. X, Y, Z, VMx, VMy and Vk which are outputted from the left edge interpolation circuit 21 are inputted to each of the start point registers 41 in each of the interpolation circuits 31, 32, 33, 34, 35 and 36 in the pixel interpolation circuit 23.

Further, the micro processor 11 reads data X, Y, Z, VMx, VMy and Vk of the points which are outputted from the left edge interpolation circuit 21 and the right edge interpolation circuit 22 once, calculates interpolation values of two vertices in accordance with the two vertex data, and defines the calculated interpolation values in the interpolation register 42 in the pixel interpolation circuit.

For example, for the scan line L1-R1 in FIG. 6, the micro processor 11 reads L1 (X, Y, Z, VMx, VMy, Vk)=(98, 101, 2.3, 0, 0.066, 1.0333) and R1 (X, Y, Z, VMx, VMy, Vk)=(101, 101, 2.8, 2.0, 0, 0.82).

Whereas the amounts of changes of X, Y, Z, VMx, VMy and Vk of the straight lines connecting the point on the left edge, which is outputted from the left edge interpolation circuit 21, and the point on the left edge, which is outputted from the right interpolation circuit 22, are ΔX, ΔY, ΔZ, ΔVMx, ΔVMy and ΔVk, and the interpolation values are dX, dY, dZ, dVMx, dVMy and dVk, the micro processor computes the interpolation values as follows: dX=1, dY=0, dZ=ΔZ/ΔX, dVMx=ΔVMx/ΔX, dVMy=ΔVMy/ΔX, dVk= ΔVk/ΔX.

For example, in FIG. 6, for the scan line L1-R1, the amounts of changes are ΔX=101−98=3, ΔY=0, ΔZ =2.8− 2.3=0.5, ΔVMx=2−0=2, ΔVMy=0−0.066=−0.066, ΔVk= 0.82−1.0333=−0.213. The interpolation values are dX=1, dY=0, dZ=0.5/3=0.1666, dVMx =2.0/3=0.666, dVMy=− 0.066/3=−0.022, dVk=−0.213/3=−0.071.

The operations of the interpolation circuits 31, 32, 33, 34, 35 and 36 in the pixel interpolation circuit 23 may be the same with the operations in the edge interpolation circuits. When necessary data for interpolation are provided in the registers (steps S31-S33), data in the start point register 41 in the interpolation circuit are inputted to the storing register 43, and the data in the storing register 43 and the data in the interpolation register are added by the adder 44. The added data are inputted to the storing register 43 and stored (step S34).

For the example of the scan line L1-R1 in FIG. 6, the data in the storing register 43 and the data in the interpolation register 42 are repeatedly used (step S35), and points P1 and P2 are created on the scan line L1-R1 sequentially.

The X, Y and Z coordinate values which are outputted from the pixel data generator 12 are outputted to the frame memory. The virtual mapping addresses VMx and VMy and the virtual mapping coefficients Vk are outputted to the virtual address converter 13.

The virtual X address converter 51 uses VMx and Vk, which are inputted to the virtual address converter 13, and makes an operation of VMx/Vk to generate an actual mapping address. Similarly, the virtual Y address converter 52 uses VMy and Vk, which are inputted, and makes an operation of VMy/Vk to generate an actual mapping address (step S40).

Accordingly, the actual mapping addresses are generated by the virtual address converter, and outputted to the mapping memory.

The mapping memory 14 outputs color data R, G and B of the addresses indicated by Mx, My to the frame memory (step S50). When the X, Y and Z coordinate values are outputted to the frame memory, an image is rendered on a screen in accordance with the color data of R, G and B.

In the following, a perspective transformation effect for the mapping data according to the above-stated operation of the mapping apparatus of this invention is explained.

Figure 10:
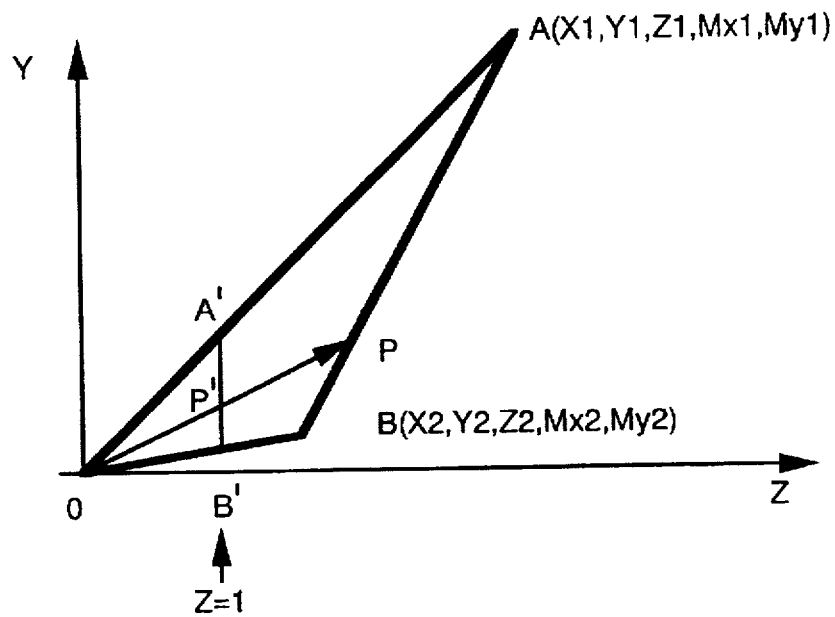
FIG. 10 shows a resolution of a perspective transformation effect in the mapping apparatus in an embodiment of this invention.
Figure 11:
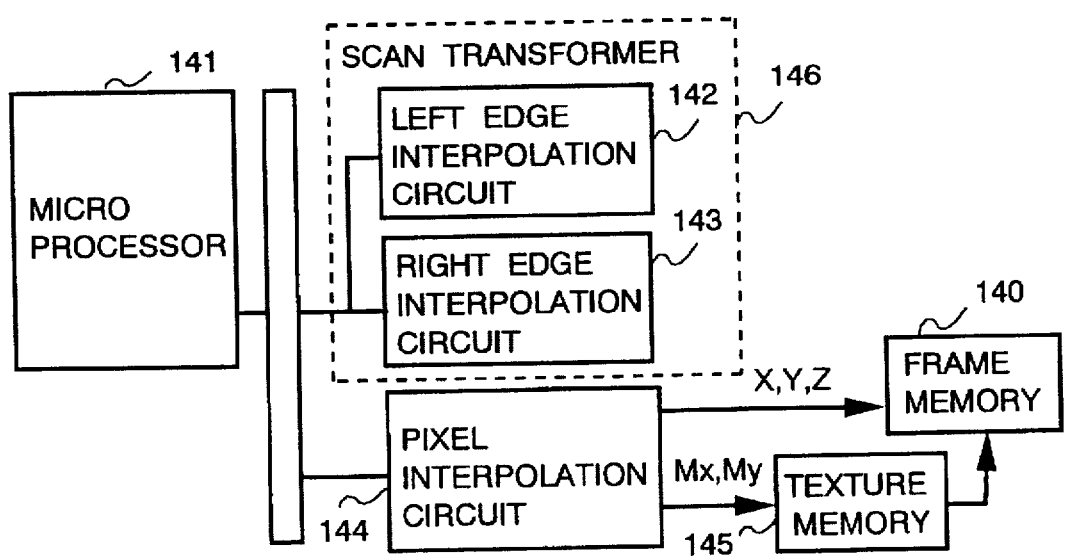
FIG. 11 is a configuration chart of the texture mapping apparatus, which is one of the mapping apparatuses according to the related art.
Figure 12:
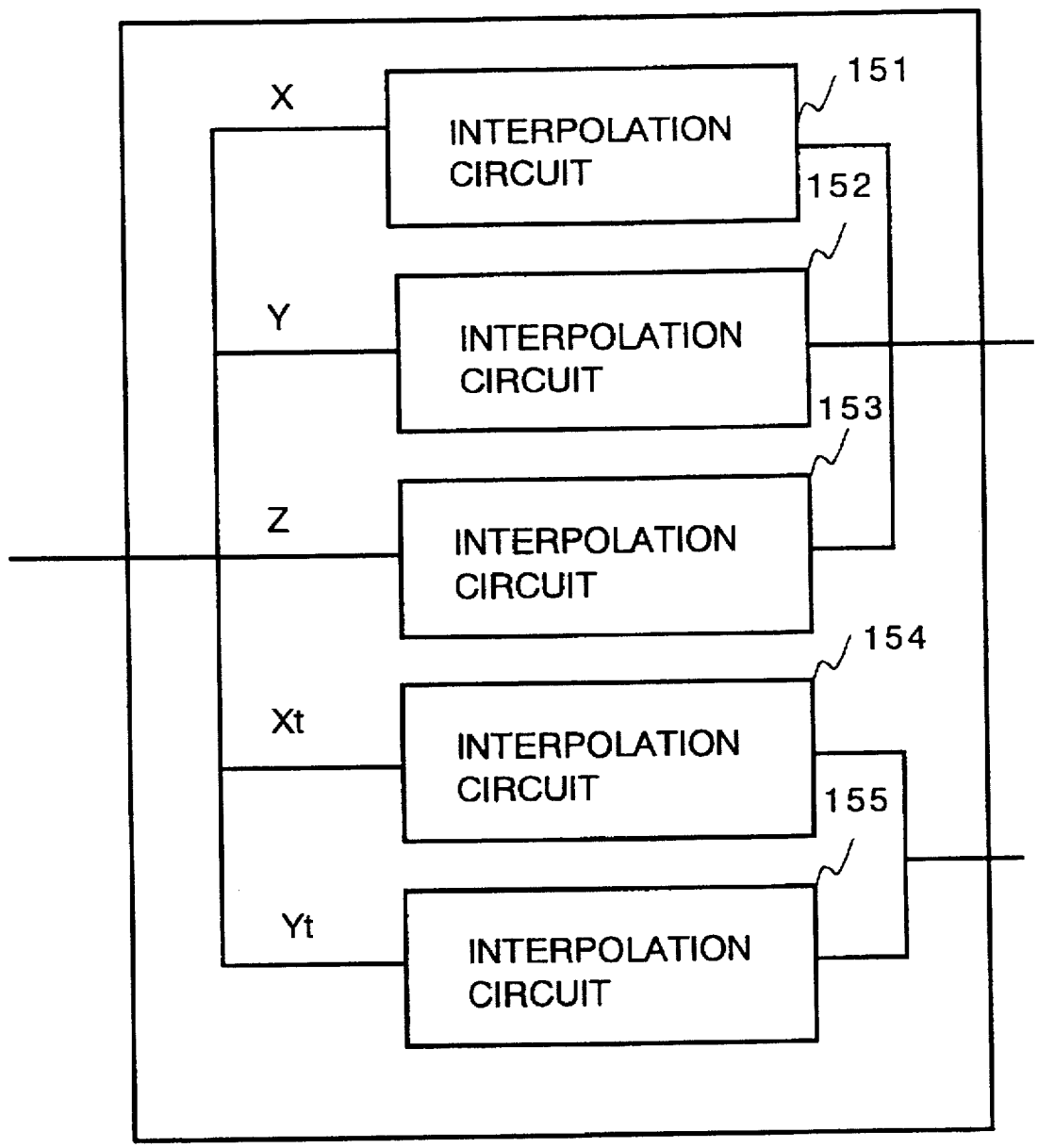
FIG. 12 is a configuration chart of the left and right edge interpolation circuits and the pixel interpolation circuit in the mapping apparatus according to the related art.
Figure 14:
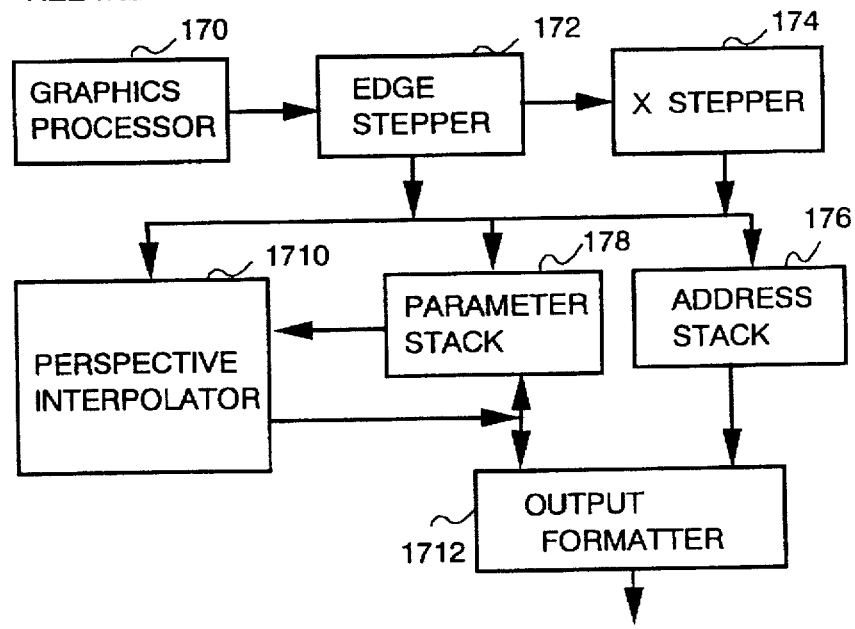
FIG. 14 is a configuration chart of a display unit with a perspective effect according to the related art.
Figure 15:
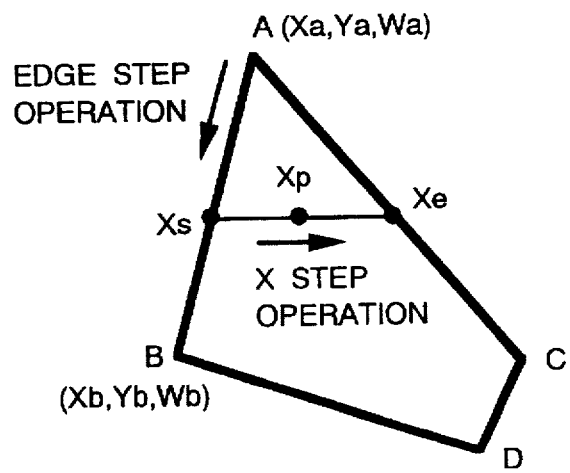
FIG. 15 is a figure to show rendering on the display unit with a perspective effect according to the related art.

FIG. 10 illustrates a perspective transformation to project an image on a plane of Z=1 from a point of view at (0,0) in a Y-Z coordinate system. In FIG. 10, the vertices A (X1, Y1, Z1, Mx1, My1) and B (X2, Y2, Z2, Mx2, My2) are transformed perspectively to points A' (X1/Z1, Y1/Z1, 1, Mx1/Z1, My1/Z1) and B' (X2/Z2, Y2/Z2, 1, Mx2/Z2, My1/Z2). Mx1 and My1 are mapping coordinate values corresponding to the vertex A, and Mx2 and My2 are mapping coordinate values corresponding to the vertex B.

According to a technique in the related art, linear interpolation mapping of contents in the mapping memory is performed for A'B'. However, according to this invention, mapping may be performed for AB, and a perspective transformation effect is realized.

For example, Y coordinate value of point P' between A' and B' is indicated as follows:

[Number 2]

$$Y = \frac{Y1}{Z1} + \left( \frac{Y2}{Z2} - \frac{Y1}{Z1} \right) t \, (0 <= t <= 1) \tag{3}$$

Y coordinate value of point P between A and B, which corresponds to the point P', is at an intersection of the straight line AB and the straight line OP'.

The straight line AB is

[Number 3]

$$Y - Y1 = \left\{ \frac{Y2-Y1}{Z2-Z1} \right\} (Z - Z1) \quad (4)$$

The straight line OP' is

[Number 4]

$$Y = \left\{ \frac{Y1}{Z1} + \left( \frac{Y2}{Z2} - \frac{Y1}{Z1} \right) t \right\} Z \quad (5)$$

Y coordinate value of the point P is calculated from the above two equations as follows:

[Number 5]

$$Y = \frac{\left\{ \frac{Y1}{Z1} + \left( \frac{Y2}{Z2} - \frac{Y1}{Z1} \right) t \right\}}{\left\{ \frac{1}{Z1} + \left( \frac{1}{Z2} - \frac{1}{Z1} \right) t \right\}} \quad (6)$$

Mx and My are calculated also as follows:

[Number 6]

$$Mx = \frac{\left\{ \frac{Mx1}{Z1} + \left( \frac{Mx2}{Z2} - \frac{Mx1}{Z1} \right) t \right\}}{\left\{ \frac{1}{Z1} + \left( \frac{1}{Z2} - \frac{1}{Z1} \right) t \right\}} \quad (7)$$

$$My = \frac{\left\{ \frac{Mx1}{Z1} + \left( \frac{My2}{Z2} - \frac{My1}{Z1} \right) t \right\}}{\left\{ \frac{1}{Z1} + \left( \frac{1}{Z2} - \frac{1}{Z1} \right) t \right\}} \quad (8)$$

Therefore, the mapping addresses of points on A'B', which are perspectively transformed, are able to be obtained by making an operation of (Mx/Z)/(b 1/Z), (My/Z)/(1/Z) from My/Z, My/Z and 1/Z, which are linearly interpolated on the segment A'B'.

In embodiment 1 of this invention, the micro processor 11 calculates Mx/Z and My/Z of the endpoints to interpolate linearly on the segment A'B'. The pixel data generator calculates Mx/Z, My/Z and 1/Z of points between A' and B', and the virtual address converter 13 makes an operation of (Mx/Z)/(1/Z), (My/Z)/(1/Z) in order to realize the above equations.

Embodiment 2

Figure 7:
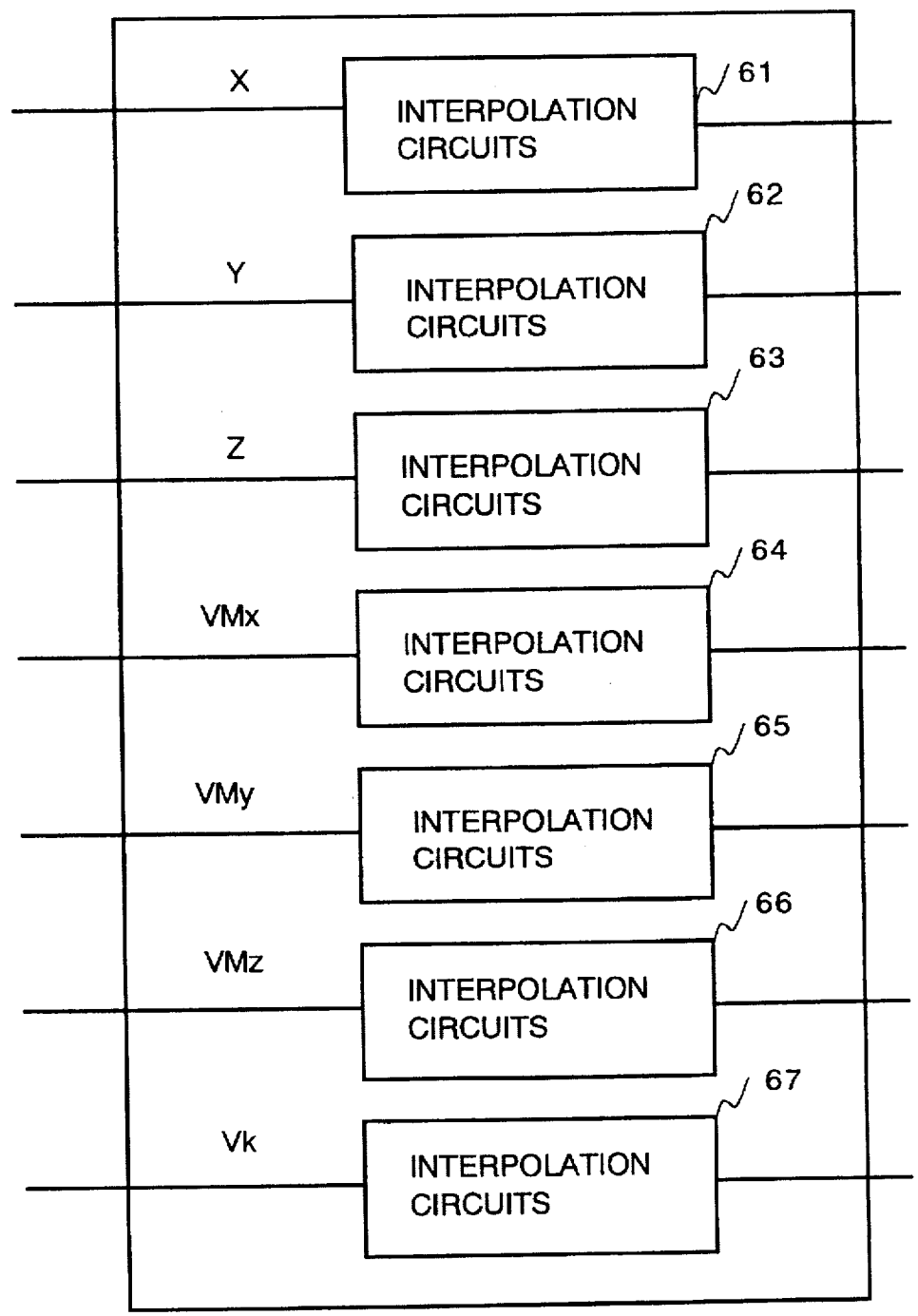
FIG. 7 is a configuration chart of the interpolation circuit in the mapping apparatus in accordance with the three-dimensional mapping memory in another embodiment of this invention.
Figure 8:
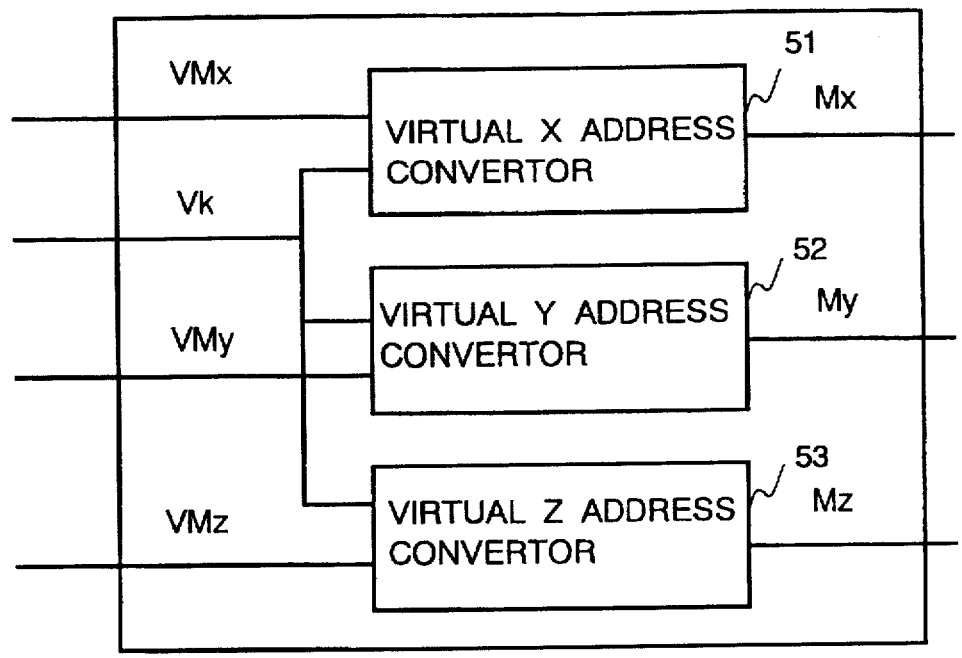
FIG. 8 is a configuration chart of the virtual address converter in the mapping apparatus in accordance with the three-dimensional mapping memory in another embodiment of this invention.

Explanation on embodiment 2 is made in reference with FIGS. 7 and 8.

FIG. 7 illustrate the left edge interpolation circuit 21, the right edge interpolation circuit 22 and the pixel interpolation circuit 23 of the pixel data generator 12 in case that the two-dimensional mapping memory, which is defined with the addresses of Mx, My in FIG. 1, is applied to a three-dimensional mapping memory, which is defined with Mx, My, Mz.

For the three-dimensional mapping memory, an interpolation circuit 66 of the virtual address Mz is provided in addition to the interpolation circuits of X, Y, Z, Mx, My and Vk for the two-dimensional mapping memory.

In FIG. 8, the virtual address converter 13 of FIG. 1 is applied to the three-dimensional mapping memory, and a virtual Z address converter 73 for Mz is provided in addition to the converter of FIG. 5.

Operation of embodiment 2 is as follows.

Mapping data to be mapped in a polygon in a display screen are stored in the mapping memory 14.

As in embodiment 1, the micro processor 11 divides edges of a displaying polygon and the edges of the mapping data. Then, the micro processor 11 converts mapping addresses which show endpoints of the mapping data corresponding to coordinate values of vertices of the polygon to the virtual mapping addresses, and computes a virtual mapping coefficient to convert the virtual mapping addresses to then original mapping addresses.

When the mapping address is (Mx, My, Mz), the virtual mapping address (VMx, VMy, VMz) is defined as VMx=Mx/Z, VMy=My/Z, VMz=Mz/Z. The virtual mapping coefficient Vk is defined as Vk=1/Z.

This virtual mapping address is provided for the pixel data generator 12. The operation of the pixel data generator 12 may be the same as in embodiment 1. The pixel interpolation circuit 66 for VMz may operate the same as the interpolation circuit for VMx, VMy in the left edge interpolation circuit 21, the right edge interpolation circuit 22 and the pixel interpolation circuit 23.

X, Y, Z are outputted from the pixel data generator 12 to the frame memory. VMx, VMy, VMz and Vk are outputted to the virtual address converter 13.

In the virtual address converter 13, the virtual Z address converter 73 makes an operation of Mz=VMx/Vk, and generates an actual mapping address. This operation may be the same as the operations of the virtual X address converter 51 and the virtual Y address converter S2 in embodiment 1.

Mx, My and Mz are outputted from the virtual address converter 13, and inputted to the mapping memory 14 as a mapping address which stores the three-dimensional mapping data. The mapping data, which is indicated by the mapping address, is outputted to the frame memory.

As stated, the three-dimensional texture data and any other volume data are used as the three-dimensional mapping data, and any plane data in the three-dimensional mapping data are able to be mapped in a rendering polygon on a screen.

Embodiment 3

Figure 9:
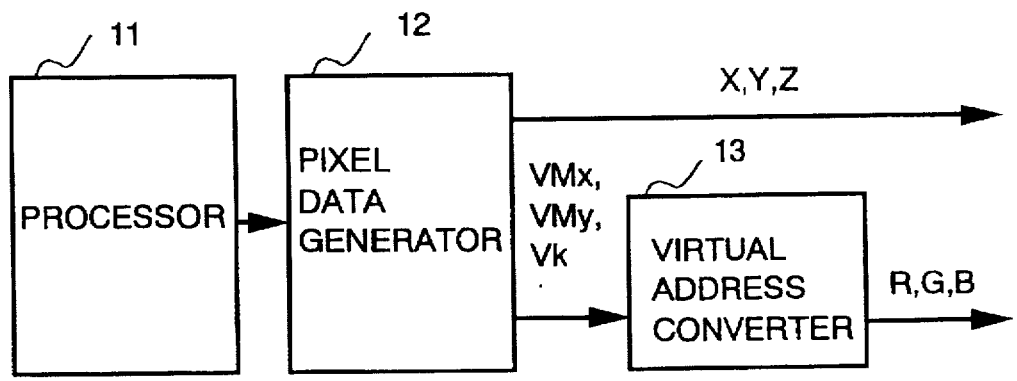
FIG. 9 is a configuration chart of the shading mapping apparatus in another embodiment of this invention.

Explanation on embodiment 3 in this invention is made in reference with FIG. 9.

FIG. 9 illustrates a shading apparatus, which the mapping memory 14 is taken out from the apparatus of FIG. 1. In this embodiment, the micro processor 11 divides the edges of the displayed polygon to the left edges and the right edges, converts color data of the vertex coordinate values of the polygon to virtual color data, and computes virtual color coefficient to convert the virtual color data to the original color data.

When the color data is defined as (R, G, B), the virtual color data (VR, VG, VB) is defined as VR=R/Z, VG=G/Z, VB=B/Z. The virtual color coefficient Vk is also defined as Vk=1/Z, which is similar to the virtual mapping coefficient. The virtual color data and the virtual color coefficient are provided for the pixel data generator 12. At the same time, each of R data, G data and B data are provided for each of the VMx interpolation circuit, VMy interpolation circuit and VMz interpolation circuit, which are shown in FIG. 7 of embodiment 2. Furthermore, the virtual color coefficient is provided for the Vk interpolation circuit to perform a same operation of the interpolation circuits in embodiment 1.

X, Y and Z, which are outputted from the pixel data generator 12, are outputted to the frame memory. VR, VG, VB and Vk are outputted to the virtual address converter 13. The virtual address converter 13 calculates R=VR/Vk, G=VG/Vk, B=VB/Vk as in embodiment 2 to convert to the color data, and outputs the color data to the frame memory.

As stated, a perspective effect is given to color changes within the drawn polygon, and more realistic image rendering is made possible.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A mapping apparatus for generating pixel data and mapping data for a rendering polygon having edges and pixels, the apparatus comprising:

a processor programmed to divide the edges of the rendering polygon into left edges and right edges, to associate the left edges and the right edges to corresponding mapping edges in two-dimensional mapping data, to divide the mapping edges into mapping data left edges and mapping data right edges, each of the mapping data left edges and mapping data right edges having endpoints, and to calculate a virtual mapping address and a virtual mapping coefficient at each endpoint of the mapping data left edges and the mapping data right edges;

a pixel data generator, coupled to the processor and having an output that provides coordinate data, a virtual mapping address, and a virtual mapping coefficient for each pixel of the rendering polygon;

a virtual address converter having an input that receives the virtual mapping address and the virtual mapping coefficient from the pixel data generator, and an output that provides a mapping address corresponding to the mapping data; and a mapping memory that stores the mapping data, the mapping memory having an input that receives the mapping address from the output of the virtual address converter, and an output that provides the mapping data that corresponds to the mapping address.

2. The mapping apparatus of claim 1, wherein the processor is programmed to define the virtual mapping address of a pixel as a fraction of a mapping address of the pixel in a Z coordinate value, and to define the virtual mapping coefficient of a pixel as an inverse number of the Z coordinate value of the pixel:

wherein the pixel data generator comprises interpolation circuits to interpolate the virtual mapping address and the virtual mapping coefficient; and wherein the virtual address converter converts the virtual mapping address to the mapping address by dividing the virtual mapping address by the virtual mapping coefficient.

3. The mapping apparatus of claim 2, wherein the interpolation circuits comprise a left interpolation circuit to interpolate left edges, a right interpolation circuit to interpolate right edges and a pixel interpolation circuit to interpolate between the left edges and the right edges.

4. The mapping apparatus of claim 3, wherein each of the left interpolation circuit and the right interpolation circuit has an input that receives the coordinate data, the virtual mapping address and the virtual mapping coefficient at endpoints of the edges of the rendering polygon, and outputs that provide coordinate data, virtual mapping address and virtual mapping coefficient at points on the edges of the rendering polygon.

5. The mapping apparatus of claim 4, wherein the pixel interpolation circuit has an input that receives coordinate data, virtual mapping address and virtual mapping coefficient of edge points, the edge points being on the edges of the rendering polygon on a same scan line, and outputs that provide coordinate data, virtual mapping address and virtual mapping coefficient of inside points, the inside edge points being inside of the rendering polygon on the same scan line.

6. The mapping apparatus of claim 5, wherein each of the left interpolation circuit, the right interpolation circuit and the pixel interpolation circuit comprise a start point register to store coordinate data, virtual mapping address and virtual mapping coefficient of a start point, an interpolation register to store interpolation values, an adder to accumulate the interpolation values in the interpolation register to a content of the start point register until an endpoint is received, and a storing register to store an accumulation result that is stored in the adder when the endpoint is received.

7. The mapping apparatus of claim 1 or 2, wherein the mapping memory stores the mapping data defined with a three-dimensional address, wherein the pixel data generator comprises interpolating circuits for a three-dimensional virtual mapping address and a virtual mapping coefficient; and wherein the virtual address converter calculates a mapping address from the three-dimensional virtual mapping address received from the pixel data generator and the virtual mapping coefficient.

8. The mapping apparatus of claim 7, wherein:

the processor is further programmed to calculate a virtual color value and a virtual color coefficient at each of the endpoints of each of the left edges and the right edges;

the pixel data generator has an output that provides coordinate data, a virtual color value, and a virtual color coefficient of the pixels of the rendering polygon;

the apparatus further comprising a virtual color converter having an input that receives the virtual color value and the virtual color coefficient from the pixel data generator, and an output that provides a color value that corresponds to the virtual color value and the virtual color coefficient.

9. The mapping apparatus of claim 8, wherein the processor is further programmed to define the virtual color value of a pixel as a fraction of color data of the pixel in a Z coordinate value, and to define the virtual color coefficient of a pixel as an inverse number of the Z coordinate value of the pixel;

wherein the pixel data generator comprises an interpolation circuit to interpolate the virtual color value and the virtual color coefficient; and wherein the virtual color converter converts the virtual color value to the color value by dividing the virtual color value by the virtual color coefficient.

10. A mapping method for determining mapping data stored in a mapping memory to be used in rendering a figure having vertices, the mapping method comprising the steps of:

calculating a virtual mapping address for each of the vertices by dividing a mapping address corresponding to each of the vertices of the rendering figure with a Z coordinate value of each of the vertices;

generating a virtual mapping coefficient for each of the vertices from the mapping address corresponding to each of the vertices, wherein the virtual mapping coefficient is defined as an inverse number of the Z coordinate value (1/Z);

interpolating along edges of the figure by interpolating a virtual mapping address and the virtual mapping coefficient linearly along edges of the figure based upon the virtual mapping coefficients and virtual mapping addresses of the vertices;

interpolating along a scan line by interpolating a virtual mapping address and a virtual mapping coefficient linearly along a scan line located between the edges to generate a virtual mapping address and virtual mapping coefficient for each pixel in the figure;

dividing the virtual mapping address of a pixel by the virtual mapping coefficient to determine a mapping address;

reading rendering data by providing the mapping address to a mapping memory; and displaying the rendering data.

11. The mapping method of claim 10, wherein the step of calculating a virtual mapping address comprises:

dividing the edges of the figure into the left edges and the right edges; and dividing the virtual mapping addresses corresponding to the vertices of the figure into virtual mapping addresses for left edges and virtual mapping addresses for right edges in accordance with the left edges and the right edges; and wherein the step of generating virtual mapping coefficients includes a step of calculating a virtual mapping address and a virtual mapping coefficient for each of the left edges and the right edges.

12. The mapping method of claim 11, wherein the step of interpolating along edges comprises the steps of:

interpolating a virtual mapping address and a virtual mapping coefficient between vertices of the left edges; and interpolating the virtual mapping address and the virtual mapping coefficient between vertices of the right edges.

13. The mapping method of claim 12, wherein the step of interpolating along a scan line comprises interpolating between a point on a left edge and a point on a right edge on a single scan line.

14. The mapping method of claim 13, wherein the step of dividing comprises a step of calculating the mapping address from the virtual mapping address and the virtual mapping coefficient.

15. The mapping method of claim 14, wherein the step of interpolating along edges further comprises the steps of:

receiving coordinate values, virtual mapping addresses and virtual mapping coefficients of the vertices of the figure;

calculating a rate of change of coordinate values, virtual mapping addresses, and virtual mapping coefficients between the vertices;

calculating interpolation values from the rates of change; and producing points on the edge of the figure by accumulating the interpolation values.

16. The mapping method of claim 15, wherein the step of interpolating along a scan line further comprises the steps of:

receiving coordinate values, virtual mapping addresses and virtual mapping coefficient of two points on edges of the figure on a single scan line;

calculating a rate of change for the coordinate values, virtual mapping address and virtual mapping coefficients between the two points;

calculating interpolation values from the rates of change; and producing pixels between the two points by accumulating the interpolation values.

17. The mapping method of claim 16, wherein the mapping address and the virtual mapping address are defined with a two-dimensional address, and wherein each of the steps of the method performs processing for the two-dimensional address.

18. The mapping method of claim 16, wherein the mapping address and the virtual mapping address are defined with a three-dimensional address, and wherein each of the steps of the method performs processing for the three-dimensional address.

19. A mapping method comprising:

dividing edges of a rendering polygon into left edges having endpoints and right edges having endpoints;

calculating a virtual color value and a virtual color coefficient at each endpoint of the left edges and the right edges;

generating coordinate data, virtual color value and virtual color coefficient for pixels that are inside and for pixels that are on the edges of the rendering polygon; and converting the virtual color value and the virtual color coefficient to a color value for each pixel.

20. The mapping method of claim 19, wherein the step of dividing includes calculating the virtual color value to be a fraction of the color value in the Z coordinate value, and calculating the virtual color coefficient to be an inverse number of the Z coordinate value;

wherein the pixel data generating step comprises a step of interpolating the virtual color values and the virtual color coefficients; and wherein the step of converting includes dividing the virtual color value by the virtual color coefficient.

21. A method for generating texture mapped data for pixels of a figure to be rendered on a display, the method comprising the steps of:

receiving a display screen that describes the pixels;

receiving a texture map that describes texture mapping data for the figure;

creating a virtual mapping space from the texture screen and the display screen, the virtual mapping space including texture mapped data for each pixel of the figure; and generating texture mapped data for the pixels from the virtual mapping space.

22. The method of claim 21, wherein the step of receiving a display screen includes receiving, for each pixel of the figure, an x coordinate, a y coordinate, a z coordinate, an x coordinate of the texture map, and a y coordinate of the texture map.

23. The method of claim 22, wherein the step of creating a virtual mapping space includes, for each pixel of the figure, the step of generating a virtual mapping address and a virtual mapping coefficient.

24. The method of claim 23, wherein the step of generating a virtual mapping address includes the steps of:

generating an x coordinate of the virtual mapping address; and generating a y coordinate of the virtual mapping address.

25. The method of claim 24, wherein:

the step of generating an x coordinate of the virtual mapping address includes dividing a value of the x coordinate of each pixel by a value of the z coordinate of each pixel; and the step of generating a y coordinate of the virtual mapping address includes dividing a value of the y coordinate of each pixel by a value of the z coordinate of each pixel; and the step of generating a virtual mapping coefficient includes determining an inverse of the z coordinate of each pixel.

26. An apparatus for generating texture mapped data for pixels of a figure to be rendered on a display, the apparatus comprising:

means for receiving a display screen that describes the pixels;

means for receiving a texture map that describes texture mapping data for the figure;

means, coupled to the means for receiving a display screen and the means for receiving a texture map, for creating a virtual mapping space from the texture screen and the display screen, the virtual mapping space including texture mapped data for each pixel of the figure; and means for generating texture mapped data for the pixels from the virtual mapping space.

27. The apparatus of claim 26, wherein the means for receiving a display screen includes means for receiving, for each pixel of the figure, an x coordinate, a y coordinate, a z coordinate, an x coordinate of the texture map, and a y coordinate of the texture map.

28. The apparatus of claim 27, wherein the means for creating a virtual mapping space includes means for generating a virtual mapping address and a virtual mapping coefficient for each pixel of the figure.

29. The apparatus of claim 28, wherein the means for generating a virtual mapping address includes:

means for generating an x coordinate of the virtual mapping address; and means for generating a y coordinate of the virtual mapping address.

30. The apparatus of claim 29, wherein:

the means for generating an x coordinate of the virtual mapping address includes means for diving a value of the x coordinate of each pixel by a value of the z coordinate of each pixel; and the means for generating a y coordinate of the virtual mapping address includes means for dividing a value of the y coordinate of each pixel by a value of the z coordinate of each pixel; and the means for generating a virtual mapping coefficient includes means for determining an inverse of the z coordinate of each pixel.

\* \* \* \* \*